(12) United States Patent
Kim et al.

(10) Patent No.: US 7,990,204 B2
(45) Date of Patent: Aug. 2, 2011

(54) VOLTAGE GENERATOR THAT PREVENTS LATCH-UP

(75) Inventors: Hyo-jin Kim, Suwon-si (KR); Jae-sung Kang, Suwon-si (KR); Jong-won Kim, Seongnam-si (KR); Si-woo Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 651 days.

(21) Appl. No.: 12/117,445

(22) Filed: May 8, 2008

(65) Prior Publication Data

US 2008/0284497 A1 Nov. 20, 2008

(30) Foreign Application Priority Data

May 14, 2007 (KR) .......................... 10-2007-0046663

(51) Int. Cl.
*G05F 1/10* (2006.01)
(52) U.S. Cl. ........................................ 327/536; 327/534
(58) Field of Classification Search .................. 327/534, 327/535, 536, 537
See application file for complete search history.

(56) References Cited

U.S. PATENT DOCUMENTS 7,355,437 B2 * 4/2008 Perisetty .......................... 326/14
7,884,665 B2 * 2/2011 Saikusa et al. ................. 327/536

FOREIGN PATENT DOCUMENTS

| JP | 06-237159 | 8/1994 |
| JP | 10-294659 | 11/1998 |
| JP | 2003-319640 | 11/2003 |
| JP | 2003-348821 | 12/2003 |

* cited by examiner

*Primary Examiner* — Jeffrey S Zweizig
(74) *Attorney, Agent, or Firm* — F. Chau & Associates, LLC

(57) ABSTRACT

A voltage generator that prevents latch-up includes: a charge pump circuit that is controlled by first through third enable signals, boosts an internal power voltage generated from an external power voltage, and generates first through fourth voltages; a detector that detects the first through third voltages and generates first through third flag signals that go logic high when the first through third voltages reach predetermined respective voltage levels and maintain logic low when the voltages do not reach the predetermined respective voltage levels; and a charge pump controller that receives the first through third flag signals, and generates the first through third enable signals to have the first through fourth voltages sequentially generated. The voltage generator can prevent latch-up that may occur in a boosting mode or in a normal operation mode.

31 Claims, 8 Drawing Sheets ent Application No. 10-2007-0046663, filed on May 14, 2007, in the Korean Intellectual Property Office, the disclosure of which is incorporated herein in its entirety by reference.

VOLTAGE GENERATOR THAT PREVENTS LATCH-UP

CROSS-REFERENCE TO RELATED PATENT APPLICATION

This application claims the benefit of Korean Patent Application No. 10-2007-0046663, filed on May 14, 2007, in the Korean Intellectual Property Office, the disclosure of which is incorporated herein in its entirety by reference.

BACKGROUND OF THE INVENTION

1. Technical Field Invention

The present disclosure relates to a voltage generator of a liquid crystal display (LCD) and, more particularly, to a voltage generator that prevents latch-up.

2. Discussion of Related Art

In a voltage generating circuit, for example, in a complementary metal oxide semiconductor (CMOS) device used generally in a charge pump circuit, a specific state called latch-up exists.

Latch-up indicates that a thyristor operation occurs at a PNPN junction included in a CMOS chip, so that excessive current flows through the chip, thereby causing destruction of the chip. Latch-up occurs when input and output voltages exceed a rated level and thus a large current flows in an internal device or when the voltage of a power terminal exceeds a rated level and, thus, an internal device is in a breakdown state. Although latch-up occurs in an instant, once a chip is in a latch-up state, the latch-up state is continuously maintained until the power is blocked by a thyristor structure, thereby ultimately causing destruction of the chip.

Latch-up that can occur in a voltage generator of a liquid crystal display (LCD) is described with reference to FIGS. 1 and 2.

FIG. 1 is a block diagram of a conventional liquid crystal display (LCD) including a voltage generator.

Referring to FIG. 1, the LCD 100 includes a timing controller 110, a source driver 120, a voltage generator 130, a gate driver 140, and a liquid crystal panel 150.

The liquid crystal panel 150 includes a plurality of gate lines G1-Gn, a plurality of source lines S1 to Sm crossing the gate lines G1 to Gn, and pixels arranged in regions defined by the gate lines and the source lines.

Each pixel includes a thin film transistor T1, a liquid crystal capacitor $C_{LC}$, and a storage capacitor $C_{ST}$ in which a gate electrode and a source electrode are respectively connected to the gate line and the source line. In such pixels, the gate lines are sequentially selected by the gate driver 140. When a gate-on voltage is applied to the selected gate lines in a pulse form, the thin film transistor T1 of the pixel connected to the gate line is turned on and then a voltage including pixel information is applied to each data line by the source driver 120. The voltage passes through the thin film transistor T1 of the corresponding pixel and is applied to the liquid crystal capacitor $C_{LC}$ and storage capacitor $C_{ST}$. When the liquid crystal and storage capacitors $C_{LC}$ and $C_{ST}$ operate, a predetermined display operation is accomplished.

The timing controller 110 receives a current pixel data signal RGB, a vertical synchronization signal V_SYNC, a horizontal synchronization signal H_SYNC, a clock signal MCLK, and a data enable signal DE input from an external device (not shown). When the vertical synchronization signal V_SYNC has, for example, a period of 1/60 of a second, that is, a period of 16.6 [mS], the horizontal synchronization signal H_SYNC has a period of 1/320 of a second, that is, a period of 50 [uS]. Thus, the vertical synchronization signal V_SYNC has a longer period than that of the horizontal synchronization signal H_SYNC.

The timing controller 110 outputs a pixel data signal RGB' and control signals, in which a data format thereof is converted in order to conform with an interface specification, to the source driver 120. The control signals provided from the timing controller 110 to the source driver 120 include a latch signal TP, a horizontal synchronization start signal STH, and a horizontal clock signal HCLK.

The gate driver 140 responds to the control signals provided from the timing controller 110, that is, a vertical synchronization start signal STV, a gate clock signal GCLK, and an output enable signal OE, and sequentially scans the gate lines G1 to Gn. In this example, the scanning indicates that a gate-on voltage VGH is sequentially applied to the gate lines G1 to Gn and, thus, the pixels of the gate lines G1 to Gn in which the gate-on voltage VGH is applied are in a recordable state.

The voltage generator 130 receives an external power voltage VCI and generates voltages needed to operate the LCD 100, for example, a first voltage (analog power voltage, AVDD), a second voltage (gate-on voltage, VGH), a third voltage (gate-off voltage, VGL), and a fourth voltage (common voltage, VCL). The gate-on voltage VGH and the gate-off voltage VGL are provided to the gate driver 140 and the analog power voltage AVDD is used as an operational voltage of the LCD 100.

When the voltages are generated, latch-up can occur in the conventional voltage generator 130.

FIG. 2 is an equivalent circuit diagram of a PNPN junction of a complementary metal oxide semiconductor (CMOS) device 200.

A charge pump circuit (not illustrated) exists in an internal circuit of the voltage generator 130 illustrated in FIG. 1, and the charge pump circuit generally includes the CMOS device 200 illustrated in FIG. 2.

An internal power voltage VCI1 used in the inside of the voltage generator 130 is generated by using the external power voltage VCI illustrated in FIG. 1. The third voltage VGL is an SI-substrate bias voltage.

The latch-up generation in a boosting mode of the voltage generator 130 will now be described with reference to FIG. 2.

When an emitter voltage of a PNP transistor Q1 is higher than a base voltage, an emitter current flows into a collector terminal. The emitter of the PNP transistor Q1 is connected to the internal power voltage VCI1 through a resistor R1. Because the base of the PNP transistor Q1 is substantially in a floating state before boosting, if the base of the PNP transistor Q1 has an electric potential of 0V that is an arbitrary voltage in an initial stage, an emitter-base voltage is $V_E = V_{BE} \approx 0.7V$ and is forward biased. In this example, the emitter current is $I_E = (VCI1 - V_E)/R1$.

When a collector voltage of the PNP transistor Q1 is $Vc = VGL + I_E*R4$ and $|VGL| < |I_E*R4|$, Vc is a positive voltage. Thus, an NPN transistor Q2 is turned on. Similarly, an NPN transistor Q3 is also turned on. Because the NPN transistors Q2 and Q3 are turned on, a current path is formed between the second voltage VGH source and a ground voltage VSS source and, thus, excessive current flows. Such an excessive-current state is called latch-up.

As described above, in a boosting mode of the voltage generator 130, when latch-up occurs due to momentary forward biasing, the circuit may be seriously damaged.

In addition, not only in a boosting mode, but also in a normal operation mode of the voltage generator 130, latch-up may occur due to an electric static discharge ESD, a surge voltage, or a faulty operation of a display drive IC DDI.

SUMMARY OF THE INVENTION

Exemplary embodiments of the present invention provide a voltage generator and voltage generating method for preventing latch-up that may occur in a boosting mode or in a normal operation mode.

According to an exemplary embodiment of the present invention, there is provided a voltage generator that prevents latch-up including: a charge pump circuit that is controlled by first through third enable signals, boosts an internal power voltage generated from an external power voltage, and generates first through fourth voltages; a detector that detects the first through third voltages and generates first through third flag signals that go logic high when the first through third voltages reach predetermined respective voltage levels and maintain logic low when the first through third voltages do not reach the predetermined respective voltage levels; and a charge pump controller that receives the first through third flag signals and generates the first through third enable signals to have the first through fourth voltages sequentially generated.

The detector may be controlled by first through third detecting signals that make the first through third flag signals be readable. The first through third detecting signals may be generated from the charge pump controller.

The detector may be controlled by a first standard voltage signal or a second standard voltage signal, wherein it compares the second voltage with one of a first standard voltage and a second standard voltage and generates the second flag signal. The first standard voltage signal or the second standard voltage signal may be generated by the charge pump controller. The first standard voltage signal may be generated during a boosting mode of the voltage generator. The second standard voltage signal may be generated during a normal operation mode of the voltage generator, and the voltage generator compares the second voltage with the second standard voltage that is lower than the first standard voltage, and detects latch-up even in the normal operation mode.

The voltage generator may further include an internal power voltage generating unit that is controlled by a power-on signal generated by the charge pump controller and that generates the internal power voltage from the external power voltage.

The detector may include: a second voltage detector that is controlled by the second detecting signal, the first standard voltage signal, and the second standard voltage signal generated by the charge pump controller, that detects the second voltage and generates the second flag signal; and a third voltage detector that is controlled by the third detecting signal generated by the charge pump controller, that detects the third voltage, and generates the third flag signal.

The second voltage detector may include: a comparator; an inverter that inverts an output of the comparator; and a NOR gate that performs logic operations on the output of the inverter and the second detecting signal and outputs the second flag signal.

The second voltage detector may further include: a second standard voltage unit that outputs the first standard voltage or the second standard voltage to a (+) terminal of the comparator; and a second voltage dividing unit that divides the second voltage by using resistors and outputs the divided second voltage to a (−) terminal of the comparator. The second standard voltage unit may include: first, second and third resistors that connect the external power voltage source and a ground voltage source in series; a first switch in which one end thereof is connected between the first resistor and the second resistor and another end thereof is connected to the (+) terminal of the comparator, thereby switching the first standard voltage; and a second switch in which one end thereof is connected between the second resistor and the third resistor and another end thereof is connected to the (+) terminal of the comparator, thereby switching the second standard voltage, wherein the first switch is controlled by the first standard voltage signal and the second switch is controlled by the second standard voltage signal. The first standard voltage signal may be generated during a boosting mode of the voltage generator, and turns on the first switch to apply the first standard voltage to the (+) terminal of the comparator, the second standard voltage signal is generated during a normal operation mode of the voltage generator, and turns on the second switch to apply the second standard voltage to the (+) terminal of the comparator.

The third voltage detector may include: a comparator; and a NOR gate that performs logic operations on the output of the comparator and the third detecting signal and outputs the third flag signal. The third voltage detector may further include: a third standard voltage unit that divides the external power voltage using resistors and outputs the divided external power voltage to the (−) terminal of the comparator; and a third voltage dividing unit that divides the difference between the external power voltage and the third voltage using resistors and outputs the divided difference to the (+) terminal of the comparator.

The detector may include: a second comparator; an inverter that inverts an output of the second comparator; a second NOR gate that performs logic operations on the output of the inverter and the second detecting signal generated by the charge pump controller and outputs the second flag signal; a third comparator; and a third NOR gate that performs logic operations on the output of the third comparator and the third detecting signal generated by the charge pump controller and outputs the third flag signal.

The detector may further include a standard voltage unit that provides one of a first standard voltage and a second standard voltage to the (+) terminal of the second comparator and provides a third standard voltage to the (−) terminal of the third comparator. The standard voltage unit may include: first, second, third, and fourth resistors that connect the external power voltage source and a ground voltage source in series; a first switch in which one end thereof is connected between the second resistor and the third resistor and another end thereof is connected to the (+) terminal of the second comparator, thereby switching the first standard voltage; and a second switch in which one end thereof is connected between the third resistor and the fourth resistor and another end thereof is connected to the (+) terminal of the second comparator, thereby switching the second standard voltage, wherein the first switch and the second switch are respectively controlled by a first standard voltage signal and a second standard voltage signal and the third standard voltage is generated between the first resistor and the second resistor.

The first standard voltage signal may be generated during a boosting mode of the voltage generator, and turns on the first switch to apply the first standard voltage to the (+) terminal of the second comparator, the second standard voltage signal is generated during a normal operation mode of the voltage generator, and turns on the second switch to apply the second standard voltage to the (+) terminal of the second comparator.

According to an exemplary embodiment of the present invention, there is provided a liquid crystal display (LCD) including: a liquid crystal panel to display an image; and a voltage generator that receives an external power voltage and generates first through fourth voltages, wherein the voltage generator comprises: a charge pump circuit that is controlled by first through third enable signals, that boosts an internal power voltage generated from the external power voltage, and that generates the first through fourth voltages; a detector that detects the first through third voltages and generates first through third flag signals that go logic high when the first through third voltages reach predetermined respective voltage levels and maintain logic low when the first through third voltages do not reach the predetermined respective voltage levels; and a charge pump controller that receives the first through third flag signals and generates the first through third enable signals to have the first through fourth voltages sequentially generated.

The detector may be controlled by a first standard voltage signal or a second standard voltage signal generated by the charge pump controller, wherein it compares the second voltage with a first standard voltage or a second standard voltage, and generates the second flag signal. The second standard voltage signal may be generated during a normal operation mode of the voltage generator, the second standard voltage, that is lower than the first standard voltage, is compared with the second voltage and latch-up is detected even during the normal operation mode.

According to an exemplary embodiment of the present invention, there is provided a voltage generating method that prevents latch-up including: boosting; and detecting the latch-up during a normal operation mode and performing the boosting when the latch-up occurs.

The boosting includes: generating a first voltage that is controlled by a power-on signal; generating a second voltage after detecting the first voltage; generating a third voltage after detecting the second voltage; and generating a fourth voltage after detecting the third voltage.

In generating a second voltage after detecting the first voltage, a first flag signal may be generated after detecting that the first voltage reaches a predetermined voltage level, a first enable signal is generated when the first flag signal is generated, and the second voltage is generated in response to the first enable signal.

In generating a third voltage after detecting the second voltage, a second flag signal may be generated after detecting that the second voltage reaches a predetermined voltage level, a second enable signal is generated when the second flag signal is generated, and the third voltage is generated in response to the second enable signal.

In generating a fourth voltage after detecting the third voltage, a third flag signal may be generated after detecting that the third voltage reaches a predetermined voltage level, a third enable signal is generated when the third flag signal is generated, and the fourth voltage is generated in response to the third enable signal.

The detecting of the latch-up may include: enabling a second detecting signal; enabling a second standard voltage signal; determining whether a second flag signal is at a logic low level; determining whether the second flag signal maintains the logic low level for a predetermined time; and setting a power-on signal to a logic low level and performing the boosting again.

In the determining of whether the second flag signal is at the logic low level, the second voltage may be compared with a second standard voltage, and when the second voltage is smaller than the second standard voltage, the second flag signal may become the logic low level. In the determining of whether the second flag signal maintains the logic low level for the predetermined time, the predetermined time may be 127 times the period of horizontal synchronization signal.

Therefore, the voltage generator and voltage generating method can prevent latch-up that may occur in a boosting mode or in a normal operation mode.

BRIEF DESCRIPTION OF THE DRAWINGS

Exemplary embodiments of the present invention will be understood in more detail from the following descriptions taken in conjunction with the attached drawings, in which.

DETAILED DESCRIPTION OF EXEMPLARY EMBODIMENTS

Figure 1:
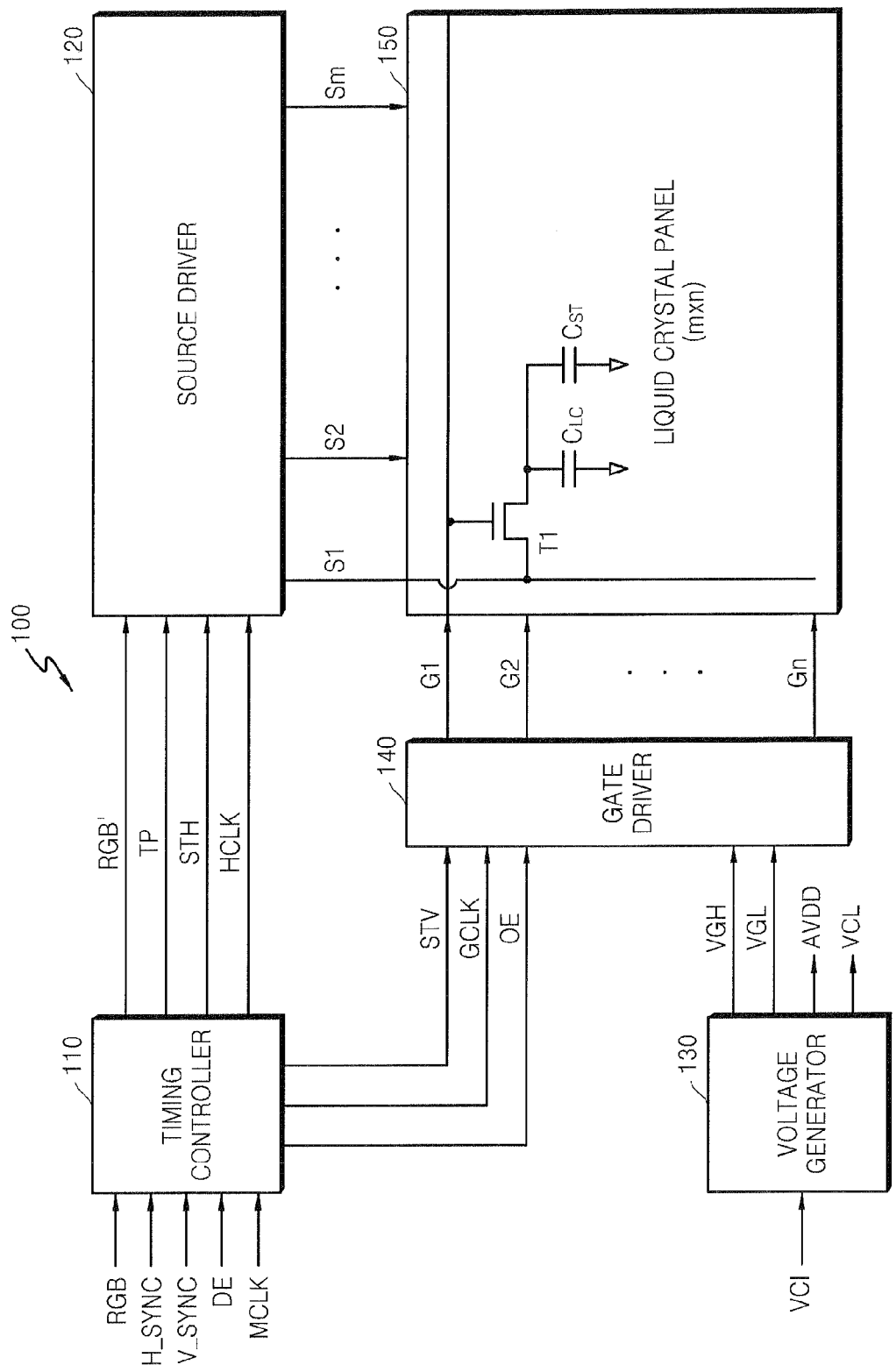
FIG. 1 is a block diagram of a conventional liquid crystal display (LCD) including a voltage generator.

Hereinafter, the present invention will be described more fully with reference to the accompanying drawings, in which exemplary embodiments of the invention are shown. In the drawings, like reference numerals denote like elements.

Figure 3:
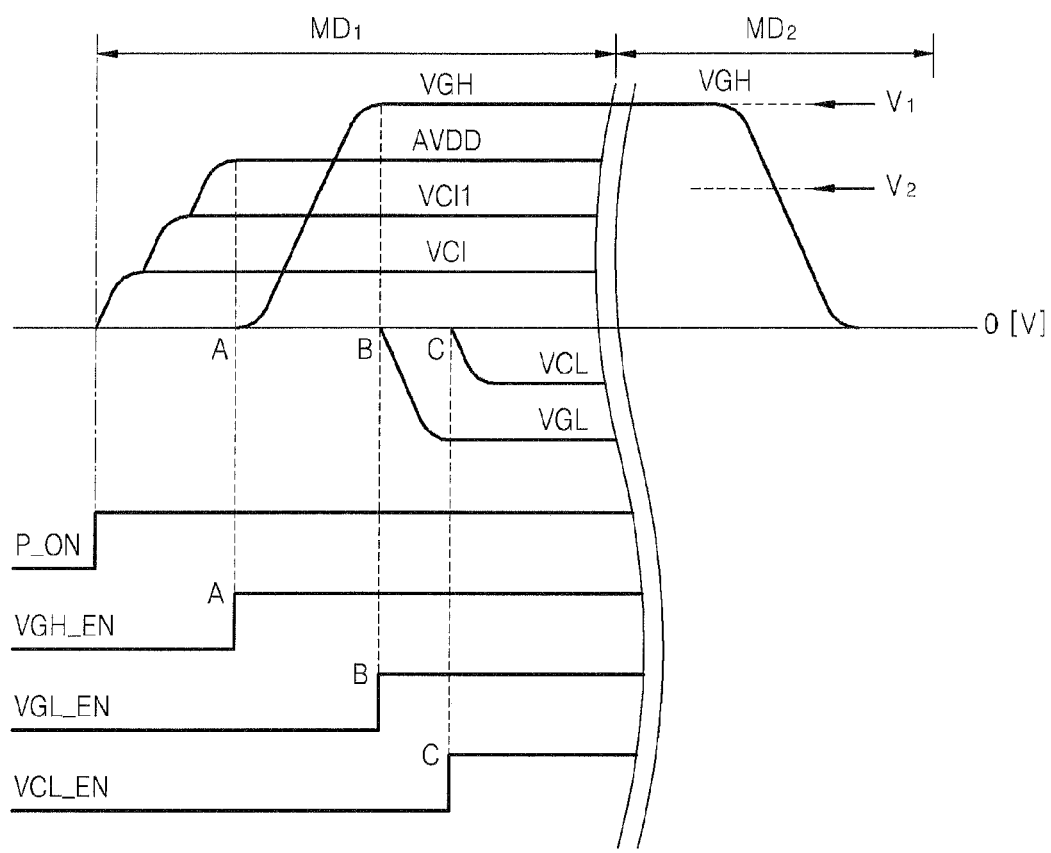
FIG. 3 is a timing diagram of enable signals and voltages related to a voltage generator according to an exemplary embodiment of the present invention.

FIG. 3 is a timing diagram of enable signals and voltages related to a voltage generator according to an exemplary embodiment of the present invention.

Referring to FIG. 3, the voltage generator 130 according to an exemplary embodiment of the present invention can prevent latch-up in both a boosting mode MD1 section and a normal operation mode MD2 section.

First, an operation of the voltage generator 130 in the boosting mode MD1 will be described.

When an external power voltage VCI starts to be supplied, the voltage generator 130 generates an internal power voltage VCI1 from a power-on signal P-ON as a starting point. In FIG. 3, the level of the internal power voltage VCI1 is higher than that of the external power voltage VCI. The level of the internal power voltage VCI1, however, can also be lower. Because the internal power voltage VCI1 increases, a first voltage AVDD is generated.

A first enable signal VGH_EN is activated at a point A where the first voltage AVDD reaches a predetermined level. When the first enable signal VGH_EN is activated, a second voltage VGH is generated. A second enable signal VGL_EN is activated at a point B where the second voltage VGH reaches a predetermined level. When the second enable signal VGL_EN is activated, a third voltage VGL is generated. A third enable signal VCL_EN is activated at a point C where the third voltage VGL is boosted to a level that is lower than a predetermined level. When the third enable signal VCL_EN is activated, a fourth voltage VCL is generated. As illustrated in FIG. 3, the third and fourth voltages VGL and VCL are lower than 0[V].

The voltage generator 130 according to an exemplary embodiment of the present invention responds to the first through third enable signals VGH_EN, VGL_EN, and VCL_EN according to a power-on sequence, and the second voltage VGH, the third voltage VGL, and the fourth voltage VCL are sequentially generated.

Figure 2:
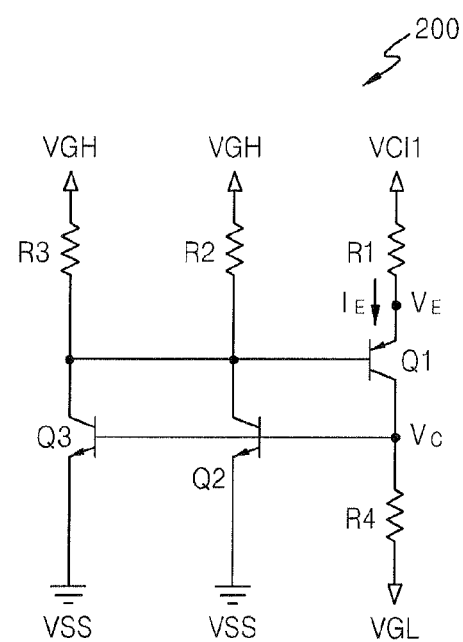
FIG. 2 is an equivalent circuit diagram of a PNPN junction of a complementary metal oxide semiconductor (CMOS) device.

Referring back to FIG. 2, in the collector voltage $Vc=VGL+I_E*R4$, the third voltage VGL maintains 0[V] until the point B, where Vc is a significantly small amount of voltage. Thus, an NPN transistor Q2 and an NPN transistor Q3 cannot be turned on, so that a current path cannot be formed between the second voltage VGH source and a ground voltage VSS.

In addition, when the voltage generator 130 is sufficiently boosted to a desired level according to a previous voltage, generation of the next voltage starts automatically. Thus, a complicated simulation does not need to be performed to sequentially generate a plurality of voltages. Also, instead of determining optimum voltage generating points by adding the minimum voltage generating point and a stability margin, as in the prior art, the next voltage is automatically generated when the voltage generator 130 is sufficiently boosted to a desired level according to a previous voltage and, thus, the time needed to generate the last boosting voltage from a power-on point is minimized. Furthermore, even if the time needed to boost voltage is changed according to a process characteristic of an electronic device and its surroundings, a plurality of voltages is stably generated.

Next, an operation of the voltage generator 130 in the normal operation mode MD is described.

Latch-up may occur due to an electric static discharge ESD, a surge voltage, or a faulty operation of a display drive IC DDI. Conventionally, when latch-up is generated in the normal operation mode MD2, the power of an entire system is turned off and then powered up again. In an exemplary embodiment of the present invention, however, a principle that the second voltage VGH is reduced to be lower than a second standard voltage V2 that is previously set is used, and a first standard voltage V1 is used in the boosting mode MD1.

When the second voltage VGH is detected in a predetermined time as it is reduced so as to be lower than the second standard voltage V2, it is determined that latch-up has occurred. In this case, the internal power voltage VCI1 that is a boosting power source is turned off so as to exit the latch-up state and the power-on sequence of the voltage generator 130 is operated again in the boosting mode MD1, thereby returning to a normal display state. A more detailed description is given below.

Figure 4:
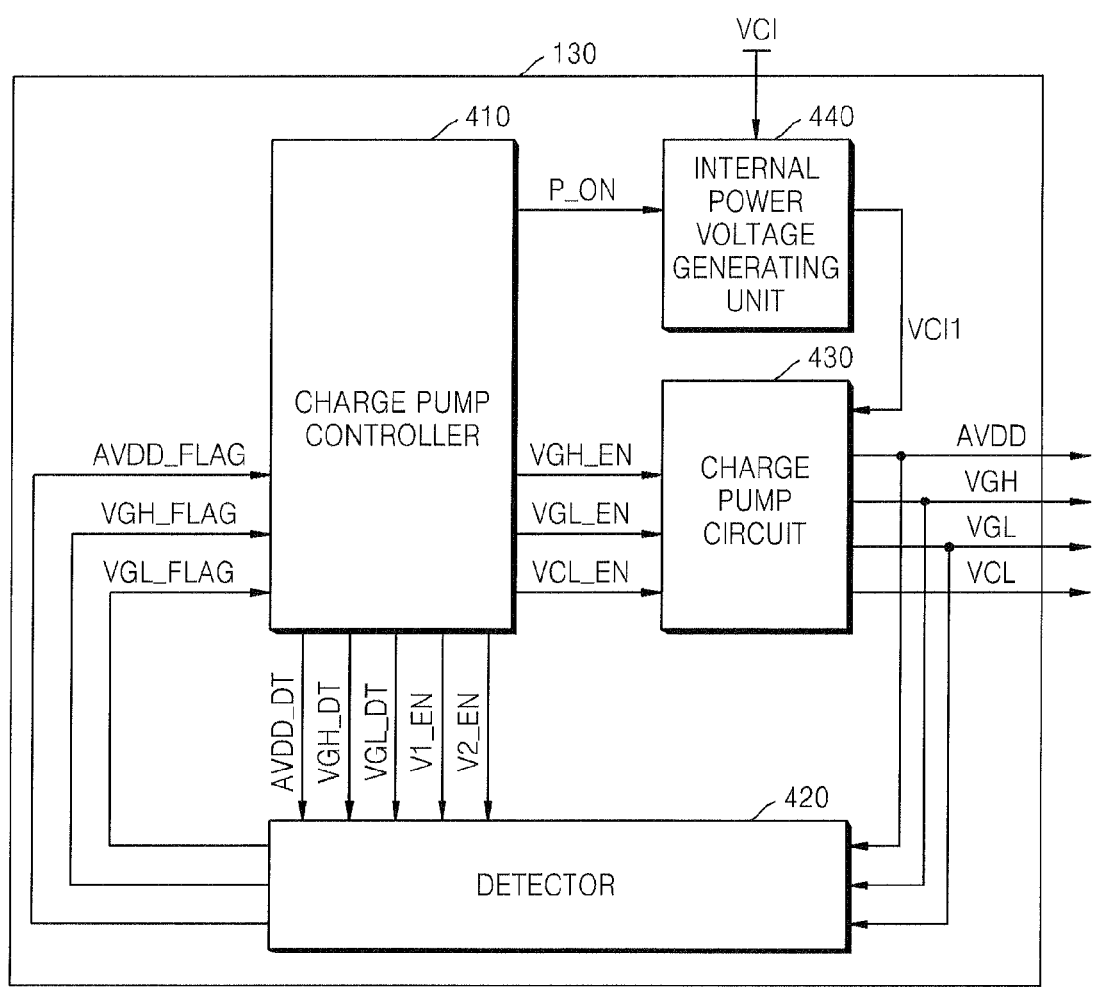
FIG. 4 is a block diagram of a voltage generator that prevents latch-up according to an exemplary embodiment of the present invention.

FIG. 4 is a block diagram of a voltage generator that prevents latch-up according to an exemplary embodiment of the present invention.

Referring to FIG. 4, the voltage generator 130 according to an exemplary embodiment of the present invention includes a charge pump circuit 430, a detector 420, and a charge pump controller 410, wherein the charge pump circuit 430 generates the first through fourth voltages AVDD, VGH, VGL, and VCL, the detector 420 generates first through third flag signals AVDD_FLAG, VGH_FLAG, and VGL_FLAG, and the pump controller 410 generates the first through third enable signals VGH_EN, VGL_EN, and VCL_EN.

The voltage generator 130 may further include an internal power voltage generating unit 440.

The charge pump circuit 430 is controlled by the first through third enable signals VGH_EN, VGL_EN, and VCL_EN and boosts the internal power voltage VCI1 generated by internal power voltage generating unit 440 using the external power voltage VCI so as to generate the first through fourth voltages AVDD, VGH, VGL, and VCL. Waveforms of the first through third enable signals VGH_EN, VGL_EN, and VCL_EN and the first through fourth voltages AVDD, VGH, VGL, and VCL are illustrated in FIG. 3.

The charge pump controller 410 receives the first through third flag signals AVDD_FLAG, VGH_FLAG, and VGL_FLAG and respectively generates the first through third enable signals VGH_EN, VGL_EN, and VCL_EN. The detector 420 detects, for example, that the first voltage AVDD reaches a predetermined level of voltage, and generates the first flag signal AVDD_FLAG with a logic high level. Then, the charge pump controller 410 generates the first enable signal VGH_EN so that the charge pump circuit 430 can generate the second voltage VGH.

When a power-on signal P_ON is applied with a logic high level from the charge pump controller 410, the internal power voltage generating unit 440 generates the internal power voltage VCI1 by using the external power voltage VCI. The internal power voltage VCI1 is applied to the charge pump circuit 430 and is used as a standard voltage that generates the first through fourth voltages AVDD, VGH, VGL, and VCL.

Figure 5:
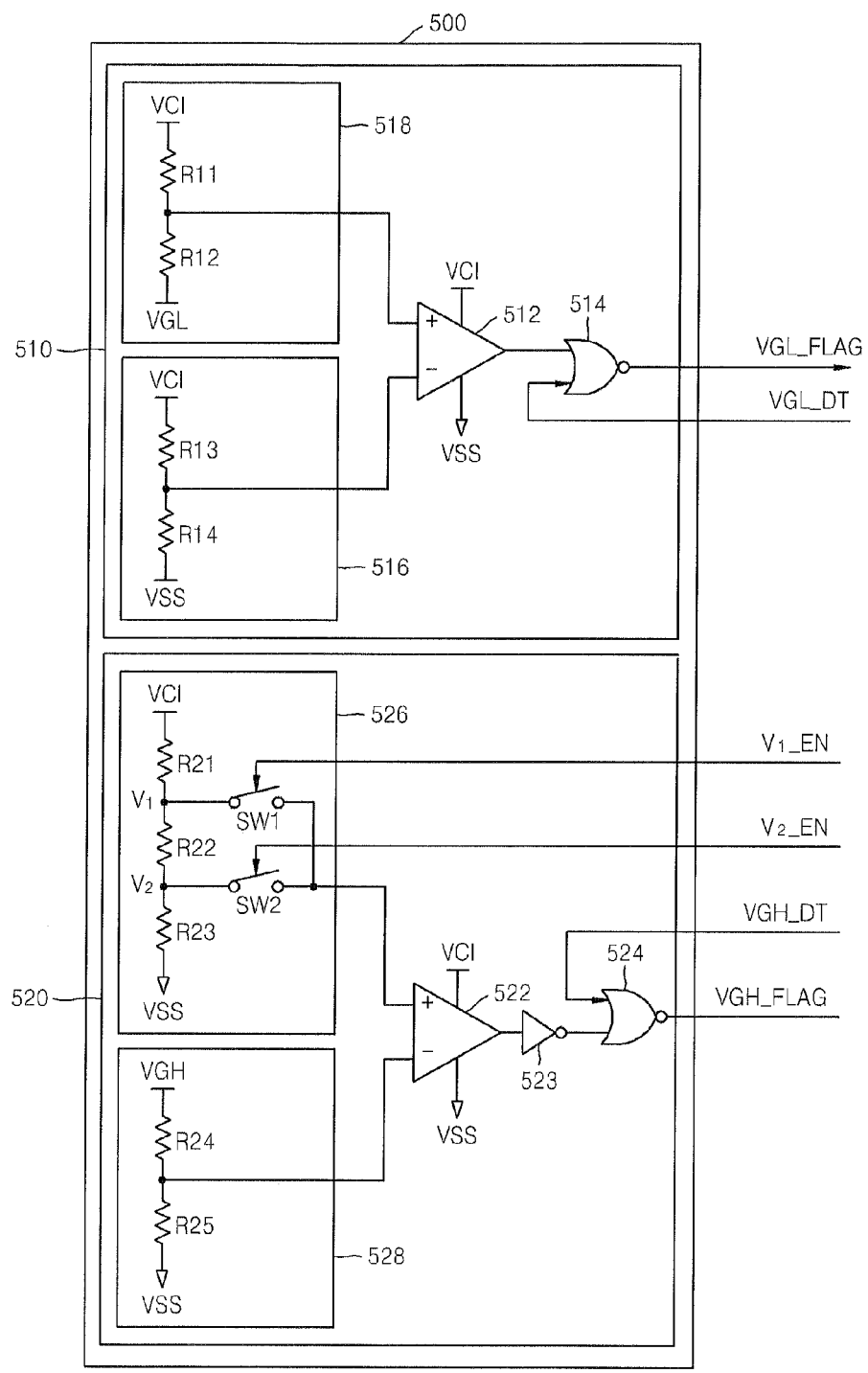
FIG. 5 illustrates a part of a circuit of a detector according to an exemplary embodiment of the present invention included in a voltage generator of an exemplary embodiment of the present invention.
Figure 6:
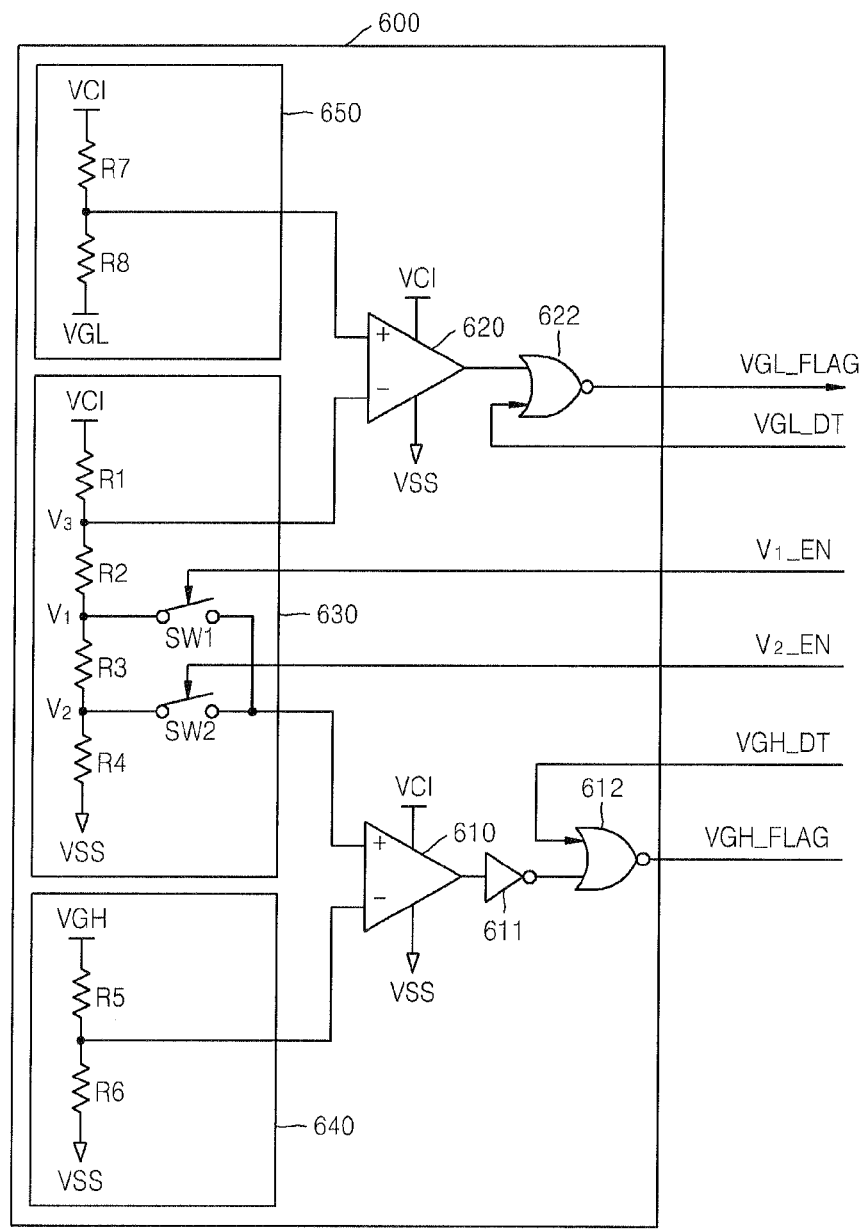
FIG. 6 illustrates a part of a circuit of a detector according to an exemplary embodiment of the present invention included in a voltage generator of an exemplary embodiment of the present invention.

The detector 420 detects the first through third voltages AVDD, VGH, and VGL and determines whether the voltages reach voltage levels of a predetermined standard. When the first through third voltages AVDD, VGH, and VGL are higher than the voltage levels of a predetermined standard, the detector 420 generates the first through third flag signals AVDD_FLAG, VGH_FLAG, and VGL_FLAG with a logic high level. When the first through third voltages AVDD, VGH, and VGL are lower than the voltage levels of a predetermined standard, the detector 420 generates the first through third flag signals AVDD_FLAG, VGH_FLAG, and VGL_FLAG with a logic low level. More detailed circuits of exemplary embodiments of the detector 420 are illustrated in FIGS. 5 and 6.

The detector 420 is controlled by first through third detecting signals AVDD_DT, VGH_DT, and VGL_DT generated by the charge pump controller 410. When the first through third detecting signals AVDD_DT, VGH_DT, and VGL_DT are enabled, the first through third flag signals AVDD_FLAG, VGH_FLAG, and VGL_FLAG become readable. When the first through third detecting signals AVDD_DT, VGH_DT, and VGL_DT are disabled, the first through third flag signals AVDD_FLAG, VGH_FLAG, and VGL_FLAG become unreadable.

The detector 420 is controlled by a first standard voltage signal V1_EN or a second standard voltage signal V2_EN generated by the charge pump controller 410.

The first standard voltage signal V1_EN is generated in a boosting mode of the voltage generator 130 to compare the second voltage VGH with a first standard voltage V1.

The second standard voltage signal V2_EN is generated from the normal operation mode of the voltage generator 130 and compares the second standard voltage V2 that is lower than the first standard voltage V1 with the second voltage VGH, thereby detecting the latch-up in the normal operation mode. In other words, in the normal operation mode of the voltage generator 130, the second voltage VGH that is of interest is compared with the second standard voltage V2. Therefore, only the second detecting signal VGH_DT is enabled from among the first through third detecting signals AVDD_DT, VGH_DT, and VGL_DT and the remaining detecting signals AVDD_DT and VGL_DT are disabled. In this case, only the second flag signal VGH_FLAG becomes readable.

FIG. 5 illustrates a part of a circuit 500 included in the detector 420 of FIG. 4.

In FIG. 5, only a detection circuit for the second voltage VGH and the third voltage VGL is illustrated. A detection circuit for the first voltage AVDD can be easily deduced with reference to FIG. 5 by one of ordinary skill in the art and thus a detailed description thereof will be omitted.

Referring to FIG. 5, a detector 500 includes a second voltage detector 520 and a third voltage detector 510. As stated above, a detailed description and drawing of a first voltage detector that is a detection circuit for the first voltage AVDD is omitted.

The second voltage detector 520 is controlled by the second detecting signal VGH_DT, the first standard voltage signal V1_EN, and the second standard voltage signal V2_EN generated by the charge pump controller 410. In order to detect the second voltage VGH, the charge pump controller 410 enables the second detecting signal VGH_DT and thus the second flag signal VGH_FLAG becomes readable.

The second voltage detector 520 includes a comparator 522, an inverter 523, and a NOR gate 524. The NOR gate 524 performs logic operations on an output of the inverter 523 and the second detecting signal VGH_DT generated by the charge pump controller 410 so as to output the second flag signal VGH_FLAG. When the charge pump controller 410 enables the second detecting signal VGH_DT, that is, to a logic low level, the second flag signal VGH_FLAG has the same value as the output of the comparator 522. This is called a readable state.

The second voltage detector 520 may further include a second standard voltage unit 526 that outputs the first standard voltage V1 or the second standard voltage V2 to a (+) terminal of the comparator 522. Also, the second voltage detector 520 may further include a second voltage dividing unit 528 that divides the second voltage VGH by using resistors R24 and R25 and outputs the divided second voltage VGH to a (−) terminal of the comparator 522.

The second standard voltage unit 526 includes first, second, and third resistors R21, R22, and R23, a first switch SW1, and a second switch SW2. The first, second, and third resistors R21, R22, and R23 are connected in series and connect the external power voltage VCI with a ground voltage VSS. One end of the first switch SW1 is connected between the first resistor R21 and the second resistor R22 and the other end of the first switch SW1 is connected to the (+) terminal of the comparator 522, thereby switching the first standard voltage V1. One end of the second switch SW2 is connected between the second resistor R22 and the third resistor R23 and the other end of the second switch SW2 is connected to the (+) terminal of the comparator 522, thereby switching the second standard voltage V2.

The first standard voltage signal V1_EN generated by the charge pump controller 410 is generated during the boosting mode of the voltage generator 130 and is applied to control the first switch SW1, so that the first standard voltage V1 is applied to the (+) terminal of the comparator 522. The second standard voltage signal V2_EN is generated during the normal operation mode of the voltage generator 130 and is applied to control the second switch SW2 so that the second standard voltage V2 is applied to the (+) terminal of the comparator 522. Accordingly, the first standard voltage signal V1_EN generated in the boosting mode and the second standard voltage signal V2_EN generated in the normal operation mode cannot be generated at the same time.

The third voltage detector 510 is controlled by the third detecting signal VGL_DT generated by the charge pump controller 410. In order to detect the third voltage VGL, the charge pump controller 410 enables the third detecting signal VGL_DT, that is, setting it to logic low, and the third flag signal VGL_FLAG becomes readable.

The third voltage detector 510 includes a comparator 512 and a NOR gate 514. The NOR gate 514 performs logic operations on an output of the comparator 512 and the third detecting signal VGL_DT so as to output the third flag signal VGL_FLAG. When the charge pump controller 410 enables the third detecting signal VGL_DT, that is, setting it to logic low, the third flag signal VGL_FLAG has the inverted value of the output of the comparator 512. When a voltage input to a (+) terminal of the comparator 512 is smaller than a voltage input to a (−) terminal of the comparator 512, the third flag signal VGL_FLAG goes logic high. This indicates that the third voltage VGL reaches a desired negative voltage.

The third voltage detector 510 may further include a third standard voltage unit 516, which divides the external power voltage VCI by using resistors R13 and R14 and outputs the divided external power voltage VCI to a (−) terminal of the comparator 512. Also, the third voltage detector 510 may further include a third voltage dividing unit 518, which divides the difference between the external power voltage VCI and the third voltage VGL by using resistors R11 and R12 and outputs the divided difference to a (+) terminal of the comparator 512.

FIG. 6 illustrates an exemplary embodiment of a part of a circuit of the detector 420 included in the voltage generator 130.

The circuit of FIG. 6 is similar with that of FIG. 5. The second standard voltage unit 526 and the third standard voltage unit 516, however, are formed as one circuit and, thus, are substituted for by a standard voltage unit 630 in FIG. 6. In FIG. 6, only a detection circuit for the second voltage VGH and the third voltage VGL is illustrated. A detection circuit for the first voltage AVDD can be easily deduced with reference to FIG. 6 by one of ordinary skill in the art and, thus, a detailed description thereof will be omitted.

Referring to FIG. 6, the detector 600 includes a second comparator 610, an inverter 611, a second NOR gate 612, a third comparator 620, and a third NOR gate 622. The detector 600 may further include the standard voltage unit 630.

When a voltage input to a (+) terminal is larger than a voltage input to a (−) terminal, the second comparator 610 outputs a logic high level signal. The inverter 611 inverts an output of the second comparator 610. The second NOR gate 612 performs logic operations on the output of the inverter 611 and the second detecting signal VHG_DT generated by the charge pump controller 410 so as to output the second flag signal VGH_FLAG.

The third NOR gate 622 performs logic operations on an output of the third comparator 620 and the third detecting signal VGL_DT generated by the charge pump controller 410, so as to output the third flag signal VGL_FLAG.

The standard voltage unit 630 provides the first standard voltage V1 or the second standard voltage V2 to the (+) terminal of the second comparator 610 and provides a third standard voltage V3 to the (−) terminal of the third comparator 620.

The standard voltage unit 630 includes first, second, third, and fourth resistors R1, R2, R3, and R4, a first switch SW1, and a second switch SW2. The first through fourth resistors R1, R2, R3, and R4 in series divide the difference between the external power voltage VCI and a ground voltage VSS. One end of the first switch SW1 is connected between the second resistor R2 and the third resistor R3 and the other end of the first switch SW1 is connected to the (+) terminal of the second comparator 610, thereby switching the first standard voltage V1. One end of the second switch SW2 is connected between the third resistor R3 and the fourth resistor R4 and other end of the second switch SW2 is connected to the (+) terminal of the second comparator 610, thereby switching the second standard voltage V2.

The first switch SW1 and the second switch SW2 are respectively controlled by the first standard voltage signal V1_NE and the second standard voltage signal V2_EN generated by the charge pump controller 410. The third standard voltage V3 is generated at the node between the first resistor R1 and the second resistor R2.

The first standard voltage signal V1_EN is generated during the boosting mode of the voltage generator 130 so as to be applied to control the first switch SW1, thereby applying the first standard voltage V1 to the (+) terminal of the second comparator 610. The second standard voltage signal V2_EN is generated during the normal operation mode of the voltage generator 130 so as to be applied to control the second switch SW2, thereby applying the second standard voltage V2 to the (+) terminal of the second comparator 610. Therefore, the first standard voltage signal V1_EN and the second standard voltage signal V2_EN cannot be generated at the same time.

The second voltage VGH is divided according to resistors R5 and R6 and the second voltage VGH is applied to the (−) terminal of the second comparator 610, and the voltage difference between the external power voltage VCI and the third voltage VGL is divided according to resistors R7 and R8 and the voltage difference is applied to the (+) terminal of the second comparator 610.

Figure 7:
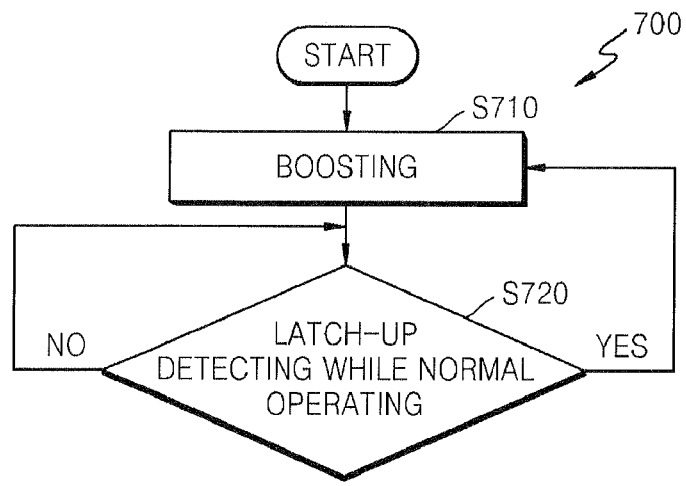
FIG. 7 is a flowchart of a voltage generating method to prevent latch-up according to an exemplary embodiment of the present invention.

FIG. 7 is a flowchart of a voltage generating method to prevent latch-up according to an exemplary embodiment of the present invention.

Referring to FIG. 7, the voltage generating method 700 includes boosting in operation S710 and latch-up detecting in operation S720. In the latch-up detecting in operation S720, even if boosting is completed, latch-up is detected while operating. Thus, when latch-up occurs, boosting in operation S710 is again performed.

Figure 8:
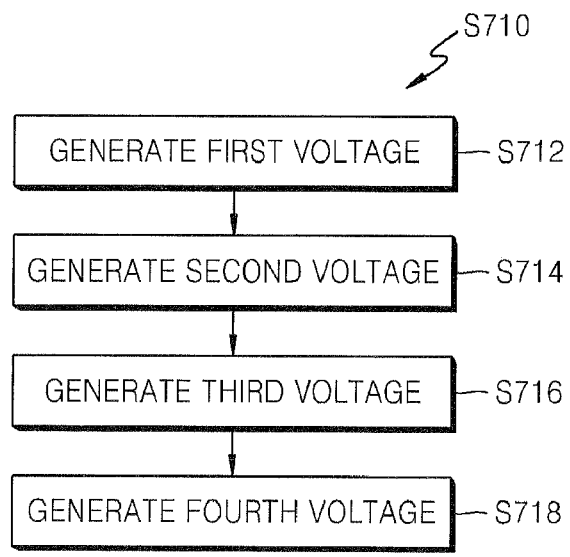
FIG. 8 is a flowchart of a boosting operation.

FIG. 8 is a flowchart of the boosting performed in operation S710 of FIG. 7.

Referring to FIG. 8, the boosting performed in operation S710 includes generating a first voltage in operation S712, the first voltage being controlled by a power-on signal P_ON, generating a second voltage after detecting the first voltage in operation S714, generating a third voltage after detecting the second voltage in operation S716, and generating a fourth voltage after detecting the third voltage in operation S718. This represents a power-on sequence.

In operation S714, it is detected that the first voltage AVDD reaches a predetermined voltage level, and the first flag signal AVDD_FLAG is generated. When the first flag signal AVDD_FLAG is generated, the first enable signal VGH_EN is generated, so that the second voltage VGH that is controlled by the first enable signal VGH_EN is generated.

In operation S716, it is detected that the second voltage VGH reaches a predetermined voltage level, and the second flag signal VGH_FLAG is generated. When the second flag signal VGH_FLAG is generated, the second enable signal VGL_EN is generated, so that a third voltage VGL that is controlled by the second enable signal VGL_EN is generated.

In operation S718, it is detected that the third voltage VGL reaches a predetermined voltage level, and the third flag signal VGL_FLAG is generated. When the third flag signal VGL_FLAG is generated, the third enable signal VCL_EN is generated, so that the fourth voltage VCL that is controlled by the third enable signal VCL_EN is generated.

Figure 9:
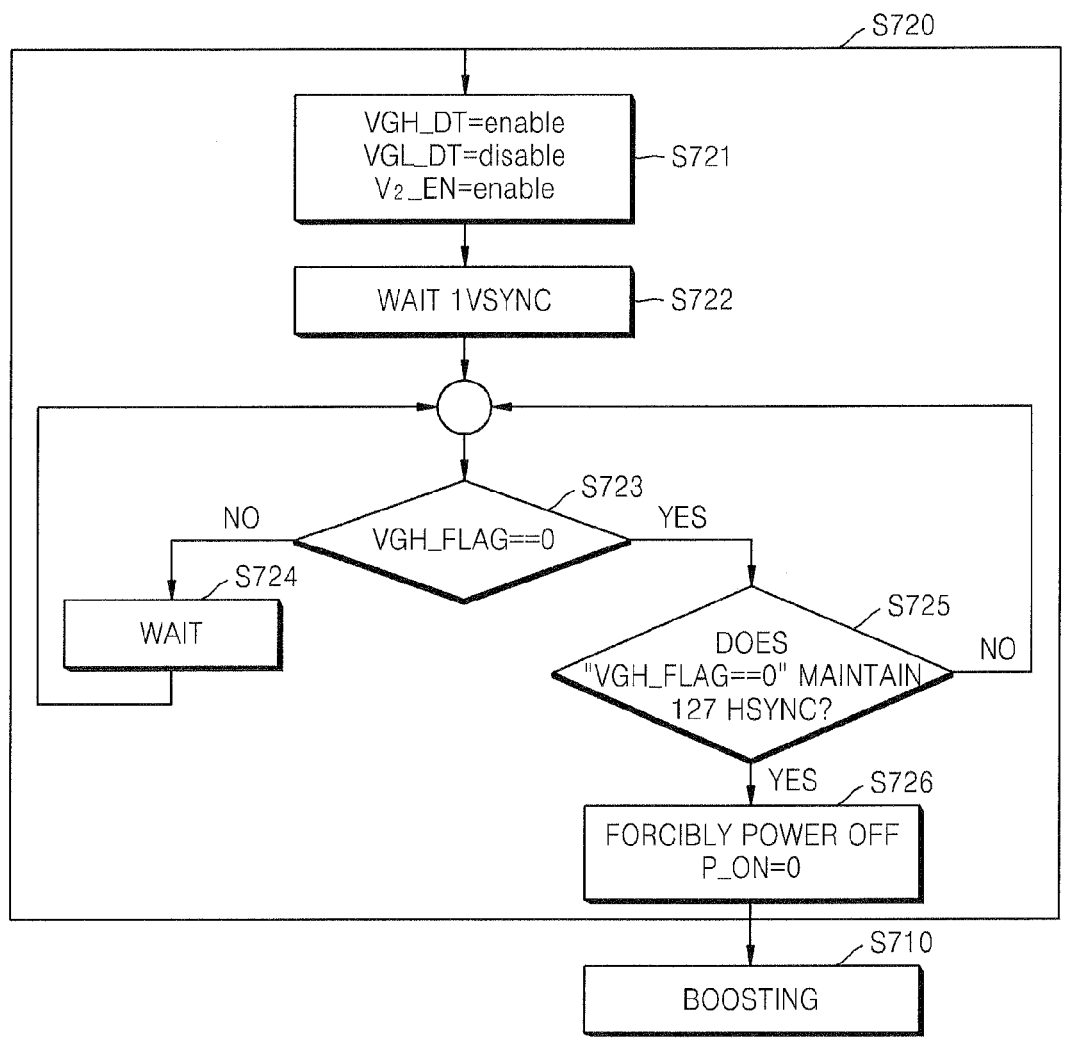
FIG. 9 is a flowchart of latch-up detecting.

FIG. 9 is a flowchart of the latch-up detecting performed in operation S720 of FIG. 7.

Referring to FIG. 9, the latch-up detecting performed in operation S720 includes enabling the second detecting signal VGH_DT and enabling the second standard voltage signal V2_EN in operation S721, determining whether the second flag signal is at a logic low level in operation S723, determining whether the second flag signal maintains a logic low level for a predetermined time in operation S725, and setting a power on signal to a logic low level in operation S726. After operation S726, boosting in operation S710 is again performed.

In operation S721, the second detecting signal VGH_DT is enabled, the third detecting signal VGL_DT is disabled, and the second standard voltage signal V2_EN is enabled. This indicates that in the latch-up detecting performed in operation S720, that is, in a normal operation mode, whether the second voltage VGH falls below the second standard voltage V2 is the only thing of interest.

In operation S722, a waiting period of 1 times the vertical synchronization signal V_SYNC elapses, so that there is time for operation S721 to be performed.

In operation S723, when the second voltage VGH is compared with the second standard voltage V2 and the second voltage VGH is smaller than the second standard voltage V2, it is determined that the second flag signal VGH_FLAG goes logic low. When the second voltage VGH falls below the second standard voltage V2, it is determined that latch-up has occurred.

In operation S725, during a time of 127 times the period of the horizontal synchronization signal H_SYNC, it is determined whether the second flag signal VGH_FLAG maintains a logic low level. This time period is provided so that it should not be determined that latch-up has occurred when the second voltage VGH falls below the second standard voltage V2 simply due to noise.

In operation S726, when the second flag signal VGH_FLAG maintains a logic low level for a predetermined time, it is determined that latch-up has occurred. In this case, the power-on signal P_ON falls to a low level so that the internal power voltage VCI1 is turned off so as to escape from the latch-up state. Then, the boosting performed in operation S710, in which a power-on sequence is performed, proceeds.

As described above, the voltage generator and voltage generating method can prevent latch-up that may occur in a boosting mode or in a normal operation mode.

While the present invention has been particularly shown and described with reference to exemplary embodiments thereof, it will be understood by those of ordinary skill in the art that various changes in form and details may be made therein without departing from the spirit and scope of the present invention, as defined by the following claims.

What is claimed is:
1. A voltage generator that prevents latch-up comprising:
a charge pump circuit that is controlled by first, second, and third enable signals, boosts an internal power voltage generated from an external power voltage, and generates first, second, third, and fourth voltages;
a detector that detects the first, second, and third voltages and generates first, second, and third flag signals that go logic high when the first, second, and third voltages reach predetermined respective voltage levels and main- tain logic low when the first, second, and third voltages do not reach the predetermined respective voltage levels; and a charge pump controller that receives the first, second, and third flag signals and generates the first, second, and third enable signals to have the first, second, third, and fourth voltages sequentially generated.

2. The voltage generator of claim 1, wherein the detector is controlled by first, second, and third detecting signals that make the first, second, and third flag signals be readable.

3. The voltage generator of claim 2, wherein the first, second, and third detecting signals are generated by the charge pump controller.

4. The voltage generator of claim 1, wherein the detector is controlled by one of a first standard voltage signal and a second standard voltage signal, and compares the second voltage with one of a first standard voltage and a second standard voltage and generates the second flag signal.

5. The voltage generator of claim 4, wherein the first standard voltage signal and the second standard voltage signal are generated by the charge pump controller.

6. The voltage generator of claim 5, wherein the first standard voltage signal is generated during a boosting mode of the voltage generator.

7. The voltage generator of claim 5, wherein the second standard voltage signal is generated during a normal operation mode of the voltage generator, and the voltage generator compares the second voltage with the second standard voltage that is lower than the first standard voltage, and detects latch-up in the normal operation mode.

8. The voltage generator of claim 1, further comprising an internal power voltage generating unit that is controlled by a power-on signal generated by the charge pump controller and generates the internal power voltage from the external power voltage.

9. The voltage generator of claim 1, wherein the detector comprises:
  a second voltage detector that is controlled by the second detecting signal, the first standard voltage signal, and the second standard voltage signal generated by the charge pump controller, detects the second voltage and generates the second flag signal; and
  a third voltage detector that is controlled by the third detecting signal generated by the charge pump controller, detects the third voltage, and generates the third flag signal.

10. The voltage generator of claim 9, wherein the second voltage detector comprises:
  a comparator;
  an inverter that inverts an output of the comparator; and
  a NOR gate that performs logic operations on the output of the inverter and the second detecting signal and outputs the second flag signal.

11. The voltage generator of claim 10, wherein the second voltage detector further comprises:
  a second standard voltage unit that outputs one of the first standard voltage and the second standard voltage to a (+) terminal of the comparator; and
  a second voltage dividing unit that divides the second voltage using resistors and outputs the divided second voltage to a (−) terminal of the comparator.

12. The voltage generator of claim 11, wherein the second standard voltage unit comprises:
  first, second, and third resistors connected in series to connect the external power voltage source and a ground voltage source in series;
  a first switch in which one end thereof is connected between the first resistor and the second resistor and another end thereof is connected to the (+) terminal of the comparator, thereby switching the first standard voltage; and
  a second switch in which one end thereof is connected between the second resistor and the third resistor and another end thereof is connected to the (+) terminal of the comparator, thereby switching the second standard voltage,
  wherein the first switch is controlled by the first standard voltage signal and the second switch is controlled by the second standard voltage signal.

13. The voltage generator of claim 12, wherein the first standard voltage signal is generated during a boosting mode of the voltage generator, and turns on the first switch to apply the first standard voltage to the (+) terminal of the comparator, the second standard voltage signal is generated during a normal operation mode of the voltage generator, and turns on the second switch to apply the second standard voltage to the (+) terminal of the comparator.

14. The voltage generator of claim 9, wherein the third voltage detector comprises:
  a comparator; and
  a NOR gate that performs logic operations on the output of the comparator and the third detecting signal and outputs the third flag signal.

15. The voltage generator of claim 14, wherein the third voltage detector further comprises:
  a third standard voltage unit that divides the external power voltage using resistors and outputs the divided external power voltage to the (−) terminal of the comparator; and
  a third voltage dividing unit that divides the difference between the external power voltage and the third voltage using resistors and outputs the divided difference to the (+) terminal of the comparator.

16. The voltage generator of claim 1, wherein the detector comprises:
  a second comparator;
  an inverter that inverts an output of the second comparator;
  a second NOR gate that performs logic operations on the output of the inverter and the second detecting signal generated by the charge pump controller and outputs the second flag signal;
  a third comparator; and
  a third NOR gate that performs logic operations on the output of the third comparator and the third detecting signal generated by the charge pump controller and outputs the third flag signal.

17. The voltage generator of claim 16, wherein the detector further comprises a standard voltage unit that provides one of a first standard voltage and a second standard voltage to the (+) terminal of the second comparator and provides a third standard voltage to the (−) terminal of the third comparator.

18. The voltage generator of claim 17, wherein the standard voltage unit comprises:
  first, second, third, and fourth resistors connected in series to connect the external power voltage source and a ground voltage source;
  a first switch in which one end thereof is connected between the second resistor and the third resistor and another end thereof is connected to the (+) terminal of the second comparator, thereby switching the first standard voltage; and
  a second switch in which one end thereof is connected between the third resistor and the fourth resistor and another end thereof is connected to the (+) terminal of the second comparator, thereby switching the second standard voltage, wherein the first switch and the second switch are respectively controlled by a first standard voltage signal and a second standard voltage signal, and the third standard voltage is generated between the first resistor and the second resistor.

19. The voltage generator of claim 18, wherein the first standard voltage signal is generated during a boosting mode of the voltage generator, and turns on the first switch to apply the first standard voltage to the (+) terminal of the second comparator, the second standard voltage signal is generated during a normal operation mode of the voltage generator, and turns on the second switch to apply the second standard voltage to the (+) terminal of the second comparator.

20. The voltage generator of claim 19, wherein the second voltage is divided using resistors and applied to the (−) terminal of the second comparator, and the difference between the external power voltage and the third voltage is divided using resistors and applied to the (+) terminal of the third comparator.

21. A liquid crystal display (LCD) comprising:
a liquid crystal panel to display an image; and
a voltage generator that receives an external power voltage and generates first, second, third, and fourth voltages,
wherein the voltage generator comprises:
a charge pump circuit that is controlled by first, second, and third enable signals, boosts an internal power voltage generated from the external power voltage, and generates the first, second, third, and fourth voltages;
a detector that detects the first, second, and third voltages and generates first, second, and third flag signals that go logic high when the first, second, and third voltages reach predetermined respective voltage levels and maintain logic low when the first, second, and third voltages do not reach the predetermined respective voltage levels; and
a charge pump controller that receives the first, second, and third flag signals and generates the first, second, and third enable signals to have the first, second, third, and fourth voltages sequentially generated.

22. The LCD of claim 21, wherein the detector is controlled by one of a first standard voltage signal and a second standard voltage signal generated by the charge pump controller, compares the second voltage with one of a first standard voltage and a second standard voltage, and generates the second flag signal.

23. The LCD of claim 22, wherein the second standard voltage signal is generated during a normal operation mode of the voltage generator, the second standard voltage, that is lower than the first standard voltage, is compared with the second voltage and latch-up is detected during the normal operation mode.

24. A voltage generating method that prevents latch-up comprising:
boosting; and
detecting the latch-up during a normal operation mode and performing the boosting when the latch-up occurs.

25. The method of claim 24, wherein the boosting comprises:
generating a first voltage that is controlled by a power on signal;
generating a second voltage after detecting the first voltage;
generating a third voltage after detecting the second voltage; and
generating a fourth voltage after detecting the third voltage.

26. The method of claim 25, wherein in generating the second voltage after detecting the first voltage, a first flag signal is generated after detecting that the first voltage reaches a predetermined voltage level, a first enable signal is generated when the first flag signal is generated, and the second voltage is generated in response to the first enable signal.

27. The method of claim 25, wherein in generating the third voltage after detecting the second voltage, a second flag signal is generated after detecting that the second voltage reaches a predetermined voltage level, a second enable signal is generated when the second flag signal is generated, and the third voltage is generated in response to the second enable signal.

28. The method of claim 25, wherein in generating the fourth voltage after detecting the third voltage, a third flag signal is generated after detecting that the third voltage reaches a predetermined voltage level, a third enable signal is generated when the third flag signal is generated, and the fourth voltage is generated in response to the third enable signal.

29. The method of claim 24, wherein the detecting of the latch-up comprises:
enabling a second detecting signal;
enabling a second standard voltage signal;
determining whether a second flag signal is at a logic low level;
determining whether the second flag signal maintains the logic low level for a predetermined time; and
setting a power-on signal to a logic low level and performing the boosting again.

30. The method of claim 29, wherein in determining whether the second flag signal is at the logic low level, the second voltage is compared with a second standard voltage, and when the second voltage is lower than the second standard voltage, the second flag signal becomes the logic low level.

31. The method of claim 29, wherein in determining whether the second flag signal maintains the logic low level for the predetermined time, the predetermined time is 127 times a period of a horizontal synchronization signal.

* * * * *